(12) United States Patent
Dusserre-Telmon et al.

(10) Patent No.: US 7,359,829 B2
(45) Date of Patent: Apr. 15, 2008

(54) METHOD OF INSPECTING THE PROFILE OF THE CONNECTION ZONE BETWEEN THE CYLINDRICAL PORTION AND THE TAPER OF A ROLLER FOR A TURBOMACHINE ROLLER BEARING

(75) Inventors: Guy Frank Paul Dusserre-Telmon, Sivry-Courtry (FR); Laurent Leeder, Saint Germain les Corbeil (FR)

(73) Assignee: Snecma, Paris (FR)

( * ) Notice: Subject to any disclaimer, the term of this patent is extended or adjusted under 35 U.S.C. 154(b) by 0 days.

(21) Appl. No.: 11/426,121

(22) Filed: Jun. 23, 2006

(65) Prior Publication Data

US 2007/0005295 A1    Jan. 4, 2007

(30) Foreign Application Priority Data

Jun. 29, 2005   (FR) .................................. 05 06628

(51) Int. Cl.
*G01B 11/24*   (2006.01)
(52) U.S. Cl. ....................................... 702/167
(58) Field of Classification Search ................ 702/167, 702/155
See application file for complete search history.

(56) References Cited

U.S. PATENT DOCUMENTS 3,699,318 A   10/1972  Underkoffler et al.
4,771,549 A   9/1988   Shelangoskie et al.
5,041,988 A   8/1991   Suzuki et al.

FOREIGN PATENT DOCUMENTS

| CA | 2 286 939    | * | 4/2001 |
| CA | 2 286 939 A1 |   | 4/2001 |
| DE | 41 34 690 A1 |   | 4/1993 |
| DE | 199 54 734 A1|   | 8/2001 |
| EP | 1 111 334 A1 |   | 6/2001 |

OTHER PUBLICATIONS http://en.wikipedia.org/wiki/derivative, p. 1-11.*
http://en.wikipedia.org/wiki/derivative_(examples), p. 1-3.*

* cited by examiner

*Primary Examiner*—Tung S. Lau
(74) *Attorney, Agent, or Firm*—Oblon, Spivak, McClelland, Maier & Neustadt, P.C.

(57) ABSTRACT

A method of inspecting the profile of the connection zone between the cylindrical portion and the taper of a roller for a turbomachine roller bearing. The method includes taking a measurement of the surface profile of the roller; on the basis of a calculation of the first derivative of the measured profile, calculating straight line segments for each of the geometrical zones of the roller, where the straight line segments model the first derivative of the measured profile; calculating the radii of curvature of the surface profile of the roller by taking the first derivative of the straight line segments; and comparing the calculated radii of curvature with predefined threshold values in order to verify continuity thereof.

9 Claims, 2 Drawing Sheets

METHOD OF INSPECTING THE PROFILE OF THE CONNECTION ZONE BETWEEN THE CYLINDRICAL PORTION AND THE TAPER OF A ROLLER FOR A TURBOMACHINE ROLLER BEARING

BACKGROUND OF THE INVENTION

The present invention relates to the general field of quality-control inspection of the profile of cylindrical rollers used in roller bearings for a turbomachine.

Rolling bearings are commonly used in the field of aviation. In a turbomachine, rolling bearings are used in particular to support a first shaft to rotate relative to a second shaft that is coaxial about the first. Such bearings are constituted essentially by balls or cylindrical rollers held in raceways formed in outer and inner rings. In general, in a turbomachine, ball bearings are used for retaining axial loads and roller bearings are used for retaining radial loads.

The rolling bearings used in a turbomachine, and in particular those having cylindrical rollers, are subjected to numerous mechanical stressed. Although the number of failures observed is quite low, it has nevertheless become necessary to improve the reliability of rolling bearings and in particular by checking the profile of such rollers. Inspecting a cylindrical bearing roller for reliability involves in particular analyzing the general profile of the roller. Such analysis can be performed using standard instruments for measuring shape and area, such as roughness measuring machines fitted with an inductive sensor using a diamond or a laser, for example.

In practice, cylindrical bearing rollers are tapered at their ends in order to avoid excess edge stresses. The connection zones between the two tapers and the cylindrical portion of a roller can also lead to contact stresses that are unacceptable in terms of roller reliability. Unfortunately, standard measurement equipment does not make it possible to inspect these connection zones. Most such instruments are restricted to measuring profiles that are simple and single (such as profiles that are plane, circular, spherical, or cylindrical) and they do not provide a reliable manner for processing profiles comprising a combination of simple profiles of the kind associated with connection zones between the tapers and the cylindrical portion of a roller. Thus, checking a cylindrical bearing roller for reliability does not include any requirement about such connection zones.

OBJECT AND SUMMARY OF THE INVENTION

A main object of the present invention is to mitigate those drawbacks by proposing a method that enables the profile of the connection zone between the cylindrical portion and the taper of a bearing roller to be inspected.

The surface profile of a bearing roller for a turbomachine is symmetrically defined by at least one first zone corresponding to the taper of the roller, at least one second zone corresponding to the connection between the cylindrical portion and the taper of the roller, and a third zone corresponding to the cylindrical portion of the roller. According to the invention, the method of inspecting the profile of the connection zone between the cylindrical portion and the taper of the roller consists in: taking a measurement of the surface profile of the roller; on the basis of a calculation of the first derivative of the measured profile, calculating straight line segments for each of said geometrical zones of the roller, where said straight line segments model the first derivative of the measured profile in order to filter out the disturbances that are superposed on the measured profile; calculating the radii of curvature of the surface profile of the roller by taking the first derivative of the straight line segments; and comparing the calculated radii of curvature with predefined threshold values in order to verify continuity thereof.

The method of the invention makes it possible to characterize the profile of the roller by processing measured points of the profile in simple manner. It is thus possible to perform reliable quality control on the profile of the roller, and in particular quality control in the connection zone between the taper and the cylindrical portion of the roller.

According to an advantageous disposition of the invention, the step of calculating the straight line segments consists in: selecting a theoretical surface profile for the roller; calculating the first derivative of the theoretical profile in order to obtain theoretical straight line segments for each of said geometrical zones of the roller; calculating the distance between the first derivative of the measured profile and the theoretical straight line segments; and calculating the gradient and the intercept on the ordinate of each straight line segment by minimizing the distance between the first derivative of the measured profile and the theoretical straight line segments.

Under such circumstances, the step of minimizing the distance between the first derivative of the measured profile and the theoretical straight line segments is preferably performed by the least squares method. The theoretical profile of the surface of the first geometrical zone of the roller may be a circular arc, that of the second geometrical zone of the roller may be another circular arc, and that of the third geometrical zone of the roller may be rectilinear.

BRIEF DESCRIPTION OF THE DRAWINGS

Other characteristics and advantages of the present invention appear from the following description made with reference to the accompanying drawings which show an implementation without any limiting character. In the figures.

DETAILED DESCRIPTION OF AN IMPLEMENTATION

In the description below, it is assumed that the surface profile being inspected is that of a cylindrical bearing roller for a turbomachine bearing. Nevertheless, the invention is applicable to inspecting the surface profile of a turbomachine part other than a roller, for example a blade root, wherever an accurate profile is essential.

Method of Inspecting a Surface Profile

Figure 1:
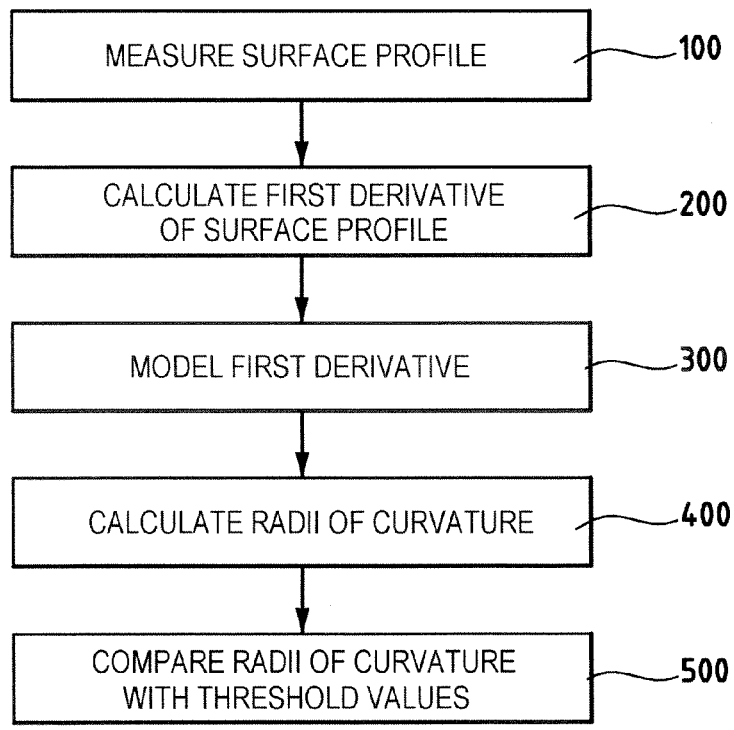
FIG. 1 is a diagram showing the different steps implemented in a method of the invention.

Reference is made initially to FIG. 1, which shows the steps in a particular implementation of the method of the invention for inspecting a profile.

In general, the method of the invention for inspecting a profile can be implemented by means of a computer system such as in particular a computer workstation equipped with software for digital data processing and connected to an instrument for measuring the surface profile of a three-dimensional part.

It is initially assumed that the surface profile of a cylindrical bearing roller can be defined geometrically by at least one first zone corresponding to the taper of the roller, by at least one second zone corresponding to the connection between the cylindrical portion and the taper of said roller, and by a third zone corresponding to the cylindrical portion of the roller.

In a first step (100) of the method, the operator measures the surface profile of the cylindrical roller under inspection. This measurement can be obtained using a standard roughness measuring machine such as a measurement appliance having an inductive sensor co-operating with a diamond or a laser, for example. In such appliances, a sensor is secured to a moving support arm capable of moving in such a manner that the sensor follows the surface profile of the roller under inspection.

The measured surface profile is presented in the form of signals giving the positions of the sensors as it travels along the surface of the roller. These signals are transmitted to the computer workstation which is connected to the sensor in order to be digitally processed therein so as to obtain a plurality of coordinates for geometrical points $N_i$ representing the geometrical profile of the surface of the roller under inspection. The points $N_i$ are uniformly spaced by a constant integer number of measurement steps and they are n in number (e.g. about 8,000).

Starting from the geometrical points as obtained in this way, the following step (200) consists in taking the first derivative of the measured surface profile, i.e. of the n geometrical points $N_i$ making up the profile. This step can be performed using calculation software equipping the computer workstation and serves to obtain geometrical coordinates $N'_i$ for the n points.

During another step (300) of the method that is described in greater detail below, for each of the geometrical zones of the roller as defined above, straight line segments are calculated that model the first derivative of the measured profile. The calculation can be performed using the calculation software equipping the computer workstation, and it serves to filter out any high frequency disturbances, whether systematic or random, that are superposed on the measured profile.

Still using the calculation software equipping the computer workstation, the radii of curvature of the surface profile of the roller under inspection are calculated (step 400) by taking the first derivative of the straight line segments as calculated during the preceding step.

Finally, in a last step (500) of the inspection method, the radii of curvature as calculated in this way, and in particular those of the connection zone between the cylindrical portion and the tapers of the roller, are compared with predefined threshold values. As a function of the results obtained during such comparison, the operator can decide whether or not to retain the roller for use in a turbomachine roller bearing. The threshold values are predefined by experiment. They are selected as a function of the location the bearing in the turbomachine, of its geometrical characteristics, of its materials, and of the external mechanical stresses applied thereto, and in particular in terms of contact pressure between the most heavily loaded roller and the raceways.

By way of example, these threshold values may be expressed in the form of a minimum radius of curvature for the zones corresponding to the connection between the cylindrical portion and each of the tapers of the roller. Beneath this minimum radius of curvature, the cylindrical roller is rejected. Such a minimum radius of curvature is defined by experiment. By way of example, for a cylindrical roller having an axial length of about 14 millimeters (mm), the minimum radius of curvature may be about 100 mm.

Another technique that can be used for selection, and that can be used in addition to the preceding technique, consists in comparing the radius of curvature of the two connection zones between the cylindrical portion and the tapers of the roller. Too great a difference between these two radii of curvature is a result of the roller being asymmetrical, and the roller is rejected.

Modeling the First Derivative of the Measured Profile

Figure 2A:
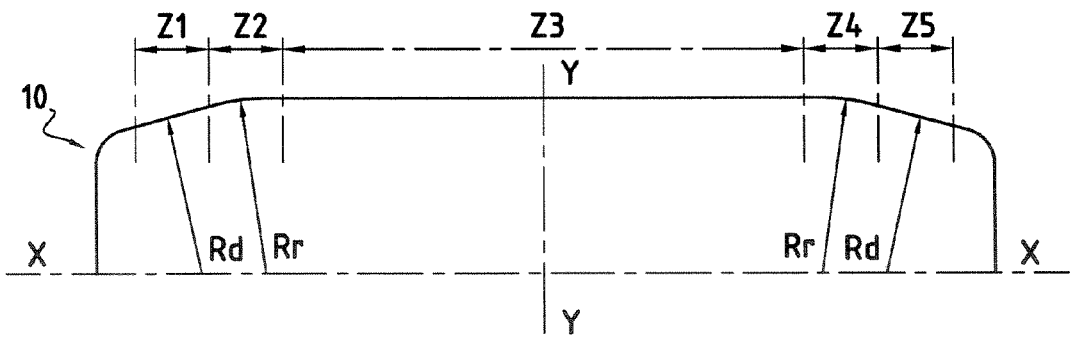
FIGS. 2A to 2C show different steps in an exemplary application of the method of the invention.
Figure 2B:
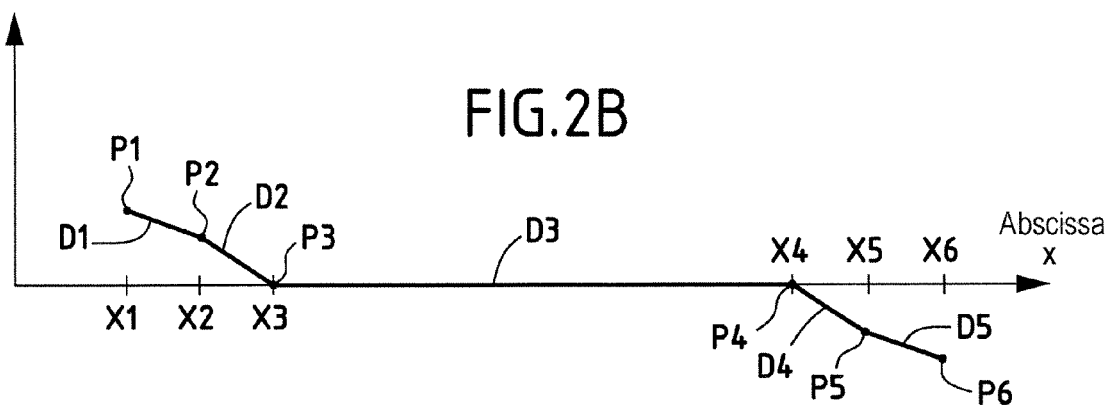
Figure 2C:
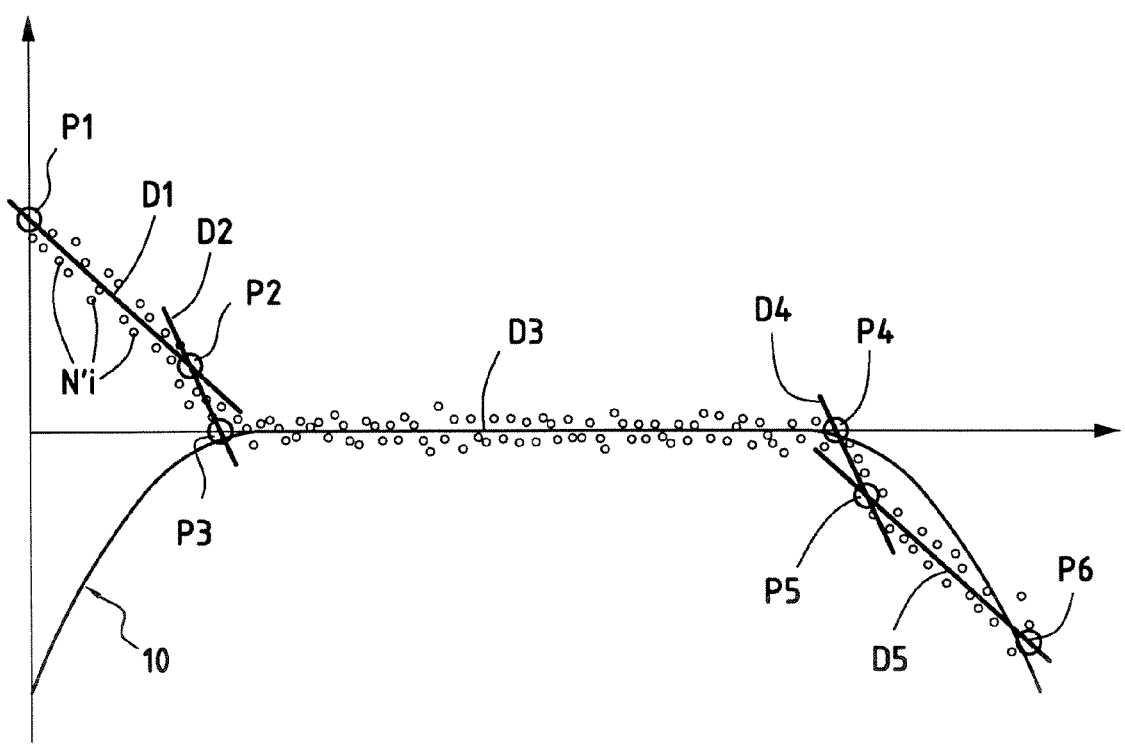

With reference to FIGS. 2A, 2B, and 2C, there follows a description of a particular implementation of the step (300) of modeling the first derivative of the measured surface profile. As mentioned above, this step is performed using calculation software equipping the computer workstation.

The first step of this modeling consists in selecting a theoretical surface profile for the cylindrical roller under inspection. The theoretical profile for the roller is selected as a function of the dimensions of the roller under inspection.

FIG. 2A is a diagram showing, by way of example, part of a theoretical surface profile for a cylindrical roller 10 for a turbomachine rolling bearing. Such a cylindrical roller is symmetrical, firstly about its main axis X-X, and secondly about a mid-axis Y-Y perpendicular to its main axis X-X.

The surface profile 10 of the roller is defined symmetrically by: two first zones $Z_1$ and $Z_5$ corresponding to the two tapers of the roller; two second zones $Z_2$ and $Z_4$ each corresponding to the connection between the cylindrical portion and a respective one of the tapers of the roller; and a third zone $Z_3$ corresponding to the cylindrical portion of the roller. The first zones $Z_1$ and $Z_5$ and the second zones $Z_2$ and $Z_4$ are symmetrical about the mid-axis Y-Y of the roller.

By way of example, for a roller having a length of about 14 mm, the geometrical zones $Z_1$ to $Z_5$ are selected as follows.

The symmetrical first zones $Z_1$ and $Z_5$ have a theoretical profile that is circular with a radius of curvature Rd of about 500 mm.

The symmetrical second zones $Z_2$ and $Z_4$ likewise have a theoretical profile that is circular with a radius Rr lying in the range 100 mm to 200 mm approximately. The axial length of each second zone lies in the range 0.7 mm to 2.1 mm.

The third zone $Z_3$ has a theoretical profile that is rectilinear and its final axial length depends on the values of the connection radii which are tangential between the tapers and the cylindrical portion. After making the connection radii by radiusing so as to have values for Rr lying in the range 100 mm to 200 mm approximately, the final rectilinear portion possesses an axial length lying in the range 4.3 mm to 7.3 mm compared with an initial length prior to radiusing lying in the range 5.6 mm to 8.2 mm. The inspection method of the invention thus makes it possible to recalculate the initial axial cylindrical length of the rollers prior to their sharp corners being removed by making the connection radii.

The following step consists in calculating the first derivative of the theoretical profile in order to obtain for each of the geometrical zones $Z_1$ to $Z_5$ of the roller respective theoretical straight line segments.

FIG. 2B shows the result of such a calculation. The five straight line segments $D_1$ to $D_5$ defined by the boundary points $P_1$ to $P_6$ represent the first derivatives of the respective geometrical zones $Z_1$ to $Z_5$.

The geometrical abscissa of each of the boundary points $P_1$ to $P_6$ is determined from the predefined axial lengths of the respective geometrical zones $Z_1$ to $Z_5$. As for the geometrical ordinates, they are calculated from the geometrical formula representing the theoretical profiles of the respective zones $Z_1$ to $Z_5$ (straight line segment for the zone $Z_3$ and circular arcs for the other zones).

Each of the straight line segments $D_1$ to $D_5$ can be represented by the following equations ($D_i$): $y'_i = a_i x + b_i$ (where $i$ varies over the range 1 to 5). The gradient $a_i$ and the intercept on the ordinate $b_i$ of each straight line segment $D_i$ are calculated using the previously calculated geometrical coordinates of the boundary points $P_1$ to $P_6$.

The following modeling step consists, for each geometrical zone $Z_1$ to $Z_5$ of the theoretical profile, in calculating the overall distance $\epsilon$ between the n geometrical points $N'_i$ constituting the first derivative of the profile measured during an earlier step (200) and the theoretical straight line segments $D_1$ to $D_5$ (FIG. 2C).

If consideration is given to the zone $Z_i$ defined between the points $P_i$ and $P_{i+1}$, then that zone possesses $[n_{i+1} - n_i + 1]$ points constituting the measured profile. The distance $\epsilon_i$ between these points and the straight line segment ($D_i$) then gives:

$$\varepsilon_i = \sum_{j=n_i}^{n_{i+1}} [y'_j - (a_i x_j + b_i)]^2$$

Calculating the overall distance $\epsilon$ between the n geometrical points $N_i$ constituting the first derivative of the measured profile and the theoretical straight line segments $D_1$ to $D_5$ is then performed using the following equation:

$$\varepsilon = \sum_{i=1}^{5} \varepsilon_i \sum_{i=1}^{5} \sum_{j=n_i}^{n_{i+1}} [y'_j - (a_i x_j + b_i)]^2$$

The following step of modeling consists in minimizing the distance $\epsilon$ between the first derivative of the measured profile and the theoretical straight line segments by the least squares method. For this purpose, if the distance $\epsilon$ is considered as being a function of the coefficients $a_i$ and $b_i$ (where $i$ lies in the range 1 to 5), its value will have a minimum for coefficient values $A_i$ and $B_i$, such that:

$$\frac{\partial \varepsilon}{\partial a_i} = 0 \text{ and } \frac{\partial \varepsilon}{\partial b_i} = 0$$

for $i$ lying in the range 1 to 5

By solving these ten equations in ten unknowns, it is possible to obtain the values for the coefficients $A_i$ and $B_i$ that represent minimizing the distance $\epsilon_i$ over each of the geometrical zones $Z_1$ to $Z_5$. These new coefficients $A_i$ and $B_i$ are the new gradient $A_i$ and intercept on the ordinate $B_i$ for new straight line segments $D'_i$ (where $i$ lies in the range 1 to 5) for which the distance to the n geometrical points $N'_i$ constituting the first derivative of the measured profile is at a minimum.

From these new coefficients $A_i$ and $B_i$ for each straight line segment $D'_i$, the following step consists in calculating the coordinates of new boundary points $P'_1$ to $P'_6$ defining the new straight line segment $D'_i$.

In order to determine the coordinates of the new boundary points $P'_1$ and $P'_6$ the calculation consists in determining the respective intercepts between the new straight line segments $D'_1$ and $D'_6$ and the lines having equation $x = X_1$ (where $X_1$ is the abscissa of the boundary point $P_1$) and $x = X_6$ (where $X_6$ is the abscissa of the boundary point $P_6$).

In order to determine the coordinates of the other new boundary points $P'_2$ to $P'_6$, consideration is given to the intercepts between the straight lines $D'_{i-1}$ and $D'_i$ in order to obtain the following coordinates for $i$ lying in the range 2 to 5:

$$X'_i = \frac{B_{i-1} - B_i}{A_i - A_{i-1}} \text{ and } Y'_i = \frac{A_i B_{i-1} - B_i}{A_i - A_{i-1}}$$

where $X'_i$ and $Y'_i$ are the coordinates of the new boundary points $P'_2$ to $P'_6$.

The following step then consists in comparing the calculated distance $\epsilon$ between the first derivative of the measured profile and the theoretical straight line segments with a convergence distance $\epsilon_{conv}$. If the calculated distance $\epsilon$ is greater than the convergence distance $\epsilon_{conv}$, then the method restarts at the step of minimizing the distance $\epsilon$ between the first derivative of the measured profile and the new straight line segments $D'_1$ and $D'_6$. This loop is repeated as often as necessary for the calculated distance $\epsilon$ to remain greater than the convergence distance $\epsilon_{conv}$.

When the calculated distance $\epsilon$ becomes less than the convergence distance $\epsilon_{conv}$, the inspection method of the invention continues from step 400 (FIG. 1), the gradient $A_i$ of each new straight line segment $D'_1$ and $D'_6$ then representing the radius of curvature of each geometrical zone of the profile of the cylindrical roller.

The value defining the convergence distance $\epsilon_{conv}$ is selected essentially on the basis of the roughness of the surface of the cylindrical roller under inspection. The above-described iterative calculation continues so long as the distance $\epsilon$ decreases. Beyond a certain threshold, a small increase in the value of $\epsilon$ is identified, which increase comes from the fact that the calculation of the convergence $\epsilon$ is performed at only n geometrical points $N'_i$ representing the first derivative of the measured profile. The value of $\epsilon$ at which this increase is identified is recorded ($\epsilon_{min}$). In the following iterations, the convergence calculation is stopped whenever the distance $\epsilon$ becomes less than $e_{conv} = 1.001 \times \epsilon_{min}$, for example.

What is claimed is:

1. A method of inspecting a surface profile of the connection zone between the cylindrical portion and the taper of a roller for a turbomachine roller bearing, the surface profile of said roller being geometrically defined by geometrical zones including at least one first zone corresponding to the taper of the roller, by at least one second zone corresponding to the connection zone between the cylindrical portion and the taper of said roller, and by a third zone corresponding to the cylindrical portion of said roller, the method comprising the steps of:

in a real space, taking a measurement of the surface profile of the roller;

in a theoretical space, determining theoretical straight line segments;

on the basis of a calculation of the first derivative of the measured surface profile and the theoretical straight line segments, calculating straight line segments for each of said geometrical zones of the roller, where said straight line segments model the first derivative of the measured surface profile in order to filter out disturbances that are superposed on the measured surface profile;

calculating radii of curvature of the surface profile of the roller by taking the first derivative of the straight line segments; and comparing the calculated radii of curvature with predefined threshold values in order to verify continuity thereof.

2. A method according to claim 1, wherein the step of calculating straight line segments comprises:

selecting a theoretical surface profile for the roller;

calculating the first derivative of the theoretical surface profile in order to obtain the theoretical straight line segments for each of said geometrical zones of the roller;

calculating the distance between the first derivative of the measured surface profile and the theoretical straight line segments; and calculating the gradient and the intercept on the ordinate of each straight line segment by minimizing the distance between the first derivative of the measured surface profile and the theoretical straight line segments.

3. A method according to claim 2, in which the step of minimizing the distance between the first derivative of the measured profile and the theoretical straight line segments is performed by the least squares method.

4. A method according to claim 2, in which the theoretical surface profile of the first geometrical zone of the roller is a circular arc, the theoretical surface profile of the second geometrical zone of the roller is another circular arc, and the theoretical surface profile of the third geometrical zone of the roller is rectilinear.

5. A method of inspecting a surface profile of the connection zone between the cylindrical portion and the taper of a roller for a turbomachine roller bearing, the surface profile of said roller being geometrically defined by geometrical zones including at least one first zone corresponding to the taper of the roller, by at least one second zone corresponding to the connection zone between the cylindrical portion and the taper of said roller, and by a third zone corresponding to the cylindrical portion of said roller, the method comprising the steps of:

in a real space, taking a measurement of the surface profile of the roller;

on the basis of a calculation of the first derivative of the measured surface profile, calculating straight line segments for each of said geometrical zones of the roller, where said straight line segments model the first derivative of the measured surface profile;

calculating radii of curvature of the surface profile of the roller by taking the first derivative of the straight line segments; and comparing the calculated radii of curvature with predefined threshold values, wherein the step of calculating straight line segments comprises:

selecting a theoretical surface profile for the roller;

in a theoretical space, calculating the first derivative of the theoretical surface profile in order to obtain theoretical straight line segments for each of said geometrical zones of the roller;

calculating the distance between the first derivative of the measured surface profile and the theoretical straight line segments; and calculating the gradient and the intercept on the ordinate of each straight line segment by minimizing the distance between the first derivative of the measured surface profile and the theoretical straight line segments.

6. The method of claim 1, wherein said step of taking said measurement of the surface profile of the roller is performed by a sensor configured to follow said surface profile of the roller and to transmit a signal to a computer, said signal corresponding to a position of the sensor as the sensor travels along said surface, and wherein said calculating steps are performed by said computer.

7. The method of claim 1, wherein said predefined threshold values correspond to minimum radii of curvature for connections zones between the cylindrical portion and tapers of the roller.

8. The method of claim 5, wherein said calculating steps are performed by a computer.

9. A method of inspecting a surface profile of the connection zone between the cylindrical portion and the taper of a roller for a turbomachine roller bearing, the surface profile of said roller being geometrically defined by geometrical zones including at least one first zone corresponding to the taper of the roller, by at least one second zone corresponding to the connection zone between the cylindrical portion and the taper of said roller, and by a third zone corresponding to the cylindrical portion of said roller, the method comprising the steps of:

selecting a theoretical surface profile of the roller such that the theoretical surface profile of the first geometrical zone of the roller is a circular arc, the theoretical surface profile of the second geometrical zone of the roller is another circular arc, and the theoretical surface profile of the third geometrical zone of the roller is rectilinear;

taking a measurement of the surface profile of the roller;

on the basis of a calculation of the first derivative of the measured surface profile and first derivatives of the selected theoretical surface, calculating straight line segments for each of said geometrical zones of the roller, where said straight line segments model the first derivative of the measured surface profile in order to filter out disturbances that are superposed on the measured surface profile;

calculating radii of curvature of the surface profile of the roller by taking the first derivative of the straight line segments; and comparing the calculated radii of curvature with predefined threshold values in order to verify continuity thereof.

* * * * *